(12) United States Patent
Huang et al.

(10) Patent No.: US 11,320,060 B2
(45) Date of Patent: May 3, 2022

(54) ELECTRIC VALVE AND THERMAL MANAGEMENT ASSEMBLY

(71) Applicant: ZHEJIANG SANHUA INTELLIGENT CONTROLS CO., LTD., Zhejiang (CN)

(72) Inventors: Quanfeng Huang, Zhejiang (CN); Dazhao Zha, Zhejiang (CN); Rongrong Zhang, Zhejiang (CN); Yingchong Lu, Zhejiang (CN); Wei Zhang, Zhejiang (CN)

(73) Assignee: ZHEJIANG SANHUA INTELLIGENT CONTROLS CO., LTD

( * ) Notice: Subject to any disclaimer, the term of this patent is extended or adjusted under 35 U.S.C. 154(b) by 0 days.

(21) Appl. No.: 17/278,288

(22) PCT Filed: Nov. 25, 2019

(86) PCT No.: PCT/CN2019/120632
§ 371 (c)(1),
(2) Date: Mar. 19, 2021

(87) PCT Pub. No.: WO2020/108435
PCT Pub. Date: Jun. 4, 2020

(65) Prior Publication Data
US 2021/0332904 A1 Oct. 28, 2021

(30) Foreign Application Priority Data
Nov. 28, 2018 (CN) .......................... 201821979283.9
Nov. 28, 2018 (CN) .......................... 201821980088.8

(51) Int. Cl.
*F16K 27/02* (2006.01)
*F16K 27/12* (2006.01)
(Continued)

(52) U.S. Cl.
CPC ........ *F16K 27/0254* (2013.01); *F16K 27/029* (2013.01); *F16K 27/12* (2013.01);
(Continued)

(58) Field of Classification Search
CPC .. F16K 27/029; F16K 37/005; B60H 1/00278
See application file for complete search history.

(56) References Cited

U.S. PATENT DOCUMENTS 5,584,466 A * 12/1996 Fukano ................. F16K 31/082
251/129.15
6,913,037 B2 * 7/2005 Miyazoe ............. F15B 13/0817
137/557

(Continued)

FOREIGN PATENT DOCUMENTS

| CN | 207364390 U | 5/2018 |
| CN | 209495003 U | 10/2019 |

OTHER PUBLICATIONS

International Search Report issued from the International Search Authority to Application No. PCT/CN2019/120632 dated Feb. 26, 2020, 4 pages.

*Primary Examiner* — Eric Keasel
(74) *Attorney, Agent, or Firm* — Hunton Andrews Kurth LLP

(57) ABSTRACT

Provided are an electric valve and a thermal management assembly. The electric valve includes a valve body, the valve body includes a first portion and a second portion, and the valve body is fixedly connected to a cover body through the first portion. The second portion includes a third wall. The first portion includes a first side wall and a second side wall, the first side wall and the second side wall are disposed opposite to each other, the first side wall and the second side
(Continued)

wall are located on two sides of the valve body, and the third wall and the first side wall are located on a same side of the valve body.

20 Claims, 10 Drawing Sheets

(51) Int. Cl.
*F16K 37/00* (2006.01)
*B60H 1/00* (2006.01)

(52) U.S. Cl.
CPC ........ *F16K 37/005* (2013.01); *B60H 1/00278* (2013.01); *B60H 1/00485* (2013.01)

(56) References Cited

U.S. PATENT DOCUMENTS

| | | | |
|---|---|---|---|
| 7,273,206 B2 * | 9/2007 | Sato | F16K 31/0627 |
| | | | 251/129.15 |
| 7,441,562 B2 * | 10/2008 | Segawa | B60T 8/368 |
| | | | 137/557 |
| 7,954,786 B2 * | 6/2011 | Narita | H01R 13/639 |
| | | | 251/129.15 |
| 9,151,396 B2 * | 10/2015 | Nalgirkar | F16K 27/041 |
| 9,638,081 B2 * | 5/2017 | Baasch | F16K 31/0644 |
| 2014/0291562 A1 | 10/2014 | Ooe et al. | |

* cited by examiner

ELECTRIC VALVE AND THERMAL MANAGEMENT ASSEMBLY

CROSS-REFERENCE TO RELATED APPLICATIONS

This application is a 35 U.S.C. § 371 United States national stage application of co-pending International Patent Application No. PCT/CN2019/120632, filed on Nov. 25, 2019, which claims priority to Chinese Patent Application No. 201821979283.9, filed on Nov. 28, 2018 and Chinese Patent Application No. 201821980088.8, filed on Nov. 28, 2018, the disclosures of which are incorporated herein by reference in their entireties.

TECHNICAL FIELD

The present application relates to the technical field of fluid control, for example, a thermal management assembly and an electric valve.

BACKGROUND

In a refrigeration system, an electric valve is mainly used to regulate a flow rate of a refrigerant. As the requirements for flow control accuracy increase, the electric valve is gradually applied to an automobile air conditioning system, a heat pump system and a battery cooling system.

Typically, in the automobile air conditioning system, the heat pump system and the battery cooling system, a weight of the electric valve will directly affect a total weight of the system. Therefore, how to reduce the weight of the electric valve is a technical problem to be considered in a design process.

SUMMARY

The present application provides an electric valve which is advantageous for light weight.

One embodiment of the present application adopts solutions described below.

An electric valve includes a valve body, a circuit board and a cover body. The cover body is disposed above the valve body, the circuit board is located in an inner cavity formed by the cover body or formed by the cover body and the valve body, and the cover body is fixedly connected to the valve body.

The valve body includes a first portion and a second portion, and the second portion is located below the first portion. The valve body is fixedly connected to the cover body through the first portion. The valve body has a first flow passage, the first flow passage includes a first open end and a second open end, and the first open end is able to be communicated with the second open end.

The second portion includes a first wall and a second wall, at least part of the first open end is located on the first wall, and at least part of the second open end is located on the second wall.

The first portion includes a first side wall and a second side wall, and the first side wall and the second side wall are located on two sides of the valve body, respectively.

The second portion further includes a third wall, the first side wall and the third wall are located on a same side of the valve body, neither the third wall nor the first side wall has the first open end or neither the third wall nor the first side wall has the second open end, and at least part of the third wall is disposed closer to a reference plane than the first side wall.

The reference plane is located between the first side wall and the second side wall and the reference plane is parallel to the first side wall or the second side wall, and the reference plane coincides with a midpoint of a first connecting line. The first connecting line is a connecting line from a midpoint of a projection of the first side wall onto a plane where the first wall is located to a midpoint of a projection of the second side wall onto the plane where the first wall is located.

A thermal management assembly includes an electric valve and a heat exchanger, the electric valve is fixedly connected to the heat exchanger, and the electric valve is the above-mentioned electric valve.

Provided is the electric valve and the thermal management assembly. The electric valve includes the valve body, the valve body includes the first portion and the second portion, and the valve body is fixedly connected to the cover body through the first portion. The first portion includes the first side wall and the second side wall, the first side wall and the second side wall are disposed opposite to each other, and the first side wall and the second side wall are located on two sides of the valve body, respectively. The second portion includes a third wall, the third wall and the first side wall are located on the same side of the valve body, and at least the portion of the third wall is disposed closer to the reference plane than the first side wall. In this way, on one hand, the cover body can be ensured to be connected to the first portion of the valve body; and on the other hand, the third wall of the second portion is disposed closer to the reference plane than the first side wall of the first portion, which facilitates reducing a weight of the valve body, thereby facilitating light weight of the electric valve and the thermal management assembly.

DETAILED DESCRIPTION

The present application will be further described with reference to the accompanying drawings and specific embodiments.

In a refrigeration system, an electric valve is used to control a flow rate of a refrigerant, and a degree of superheat of a system is controlled by adjusting the flow rate of the refrigerant. The electric valve controls an opening degree based on an electric signal, so as to control the flow rate of the refrigerant. In order to improve control accuracy of the flow rate, the electric valves is gradually used as a throttling element in an automobile air conditioning system, a heat pump system and a battery cooling system.

Figure 1:
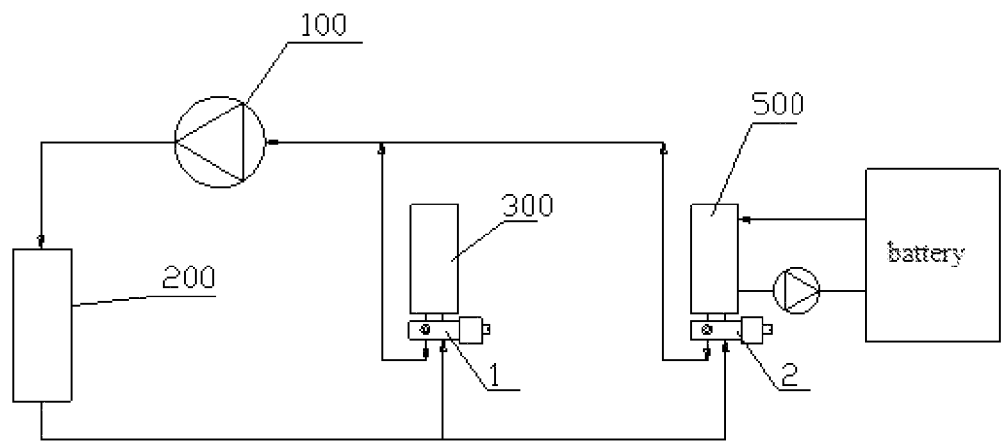
FIG. 1 is a schematic block diagram of a refrigeration system according to one embodiment provided by the present disclosure.

FIG. 1 is a schematic block diagram of a refrigeration system according to an embodiment. In this embodiment, the refrigeration system includes an air conditioning system and a battery cooling system. The air conditioning system includes a compressor 100, a condenser 200, a first electric valve 1, and an evaporator 300. When the air conditioning system works, a refrigerant is compressed into a high-temperature and high-pressure refrigerant by the compressor 100, the high-temperature and high-pressure refrigerant dissipates heat through the condenser 200 and then becomes a normal-temperature and high-pressure refrigerant, and the normal-temperature and high-pressure refrigerant enters the evaporator 300 through the first electric valve 1. Since a pressure of the normal-temperature and high-pressure refrigerant decreases after the normal-temperature and high-pressure refrigerant passes through the first electric valve 1, the normal-temperature and high-pressure refrigerant vaporizes to become a low-temperature refrigerant, and the low-temperature refrigerant absorbs a large amount of heat through the evaporator 300 to become a refrigerant and returns to the compressor 100. The battery cooling system includes a thermal management assembly, and the refrigerant in the air conditioning system and a working medium of the battery cooling system perform heat exchange in thermal management assembly.

Figure 2:
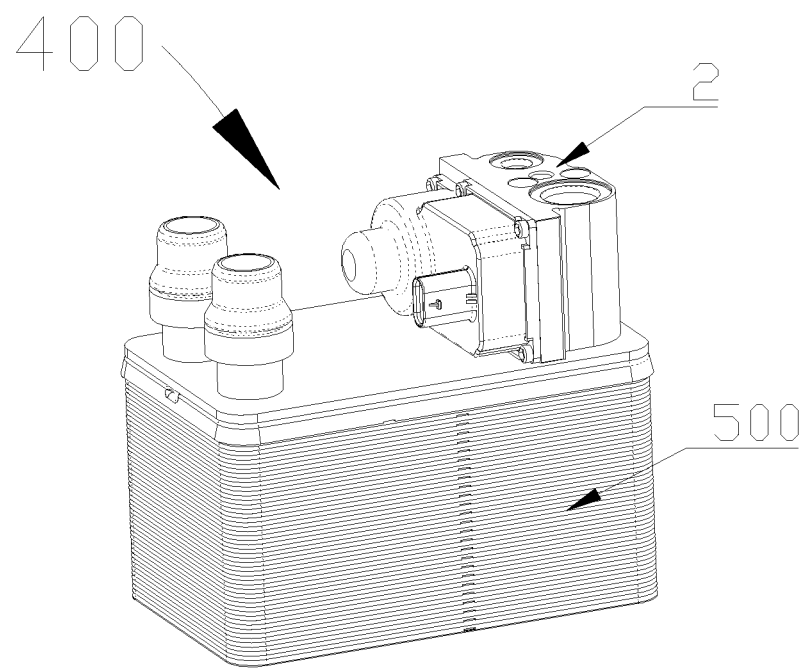
FIG. 2 is a structural diagram of a thermal management assembly according to one embodiment provided by the present disclosure.

FIG. 2 is a structure diagram of a thermal management assembly according to an embodiment. In this embodiment, the thermal management assembly 400 includes a heat exchanger 500 and a second electric valve 2, the heat exchanger 500 and the second electric valve 2 are integrated into one integral piece, and the refrigerant in the air conditioning system and the working medium of the battery cooling system perform the heat exchange in the heat exchanger 500. In this embodiment, a structure of the first electric valve 1 is the same as a structure of the second electric valve 2, and the first electric valve 1 and the second electric valve 2 will be collectively referred to as the electric valve below. Apparently, the structure of the first electric valve and the structure of the second electric valve may also be different, or the battery cooling system does not use the electric valve, as long as one of the first electric valve and the second electric valve has a same structure as the electric valve of the present solution, which are both within the protection range of the present solution.

Referring to FIG. 3 to FIG. 6, in some embodiments, the electric valve 1 includes a valve body 11, a valve base 12, a spool 13, a rotor assembly 14, a stator assembly 15 and a circuit board 16, the valve base 12 is formed with a valve port 120, and the stator assembly 15 is located at an outer periphery of the rotor assembly 14. In this embodiment, a sleeve 19 is disposed between the stator assembly 15 and the rotor assembly 14 to isolate the stator assembly 15 and the rotor assembly 14, and the stator assembly 15 is electrically connected and/or signal-connected to the circuit board 16. In some embodiments, when the electric valve 1 works, the stator assembly 15 is controlled to generate a variable excitation magnetic field by controlling current of a winding of the stator assembly 15 to change according to a predetermined rule, and the rotor assembly 14 rotates under the action of the excitation magnetic field. In this embodiment, the rotor assembly 14 can drive the spool 13 to move relative to the valve base 12 and adjust the opening degree of the valve port 120.

Figure 3:
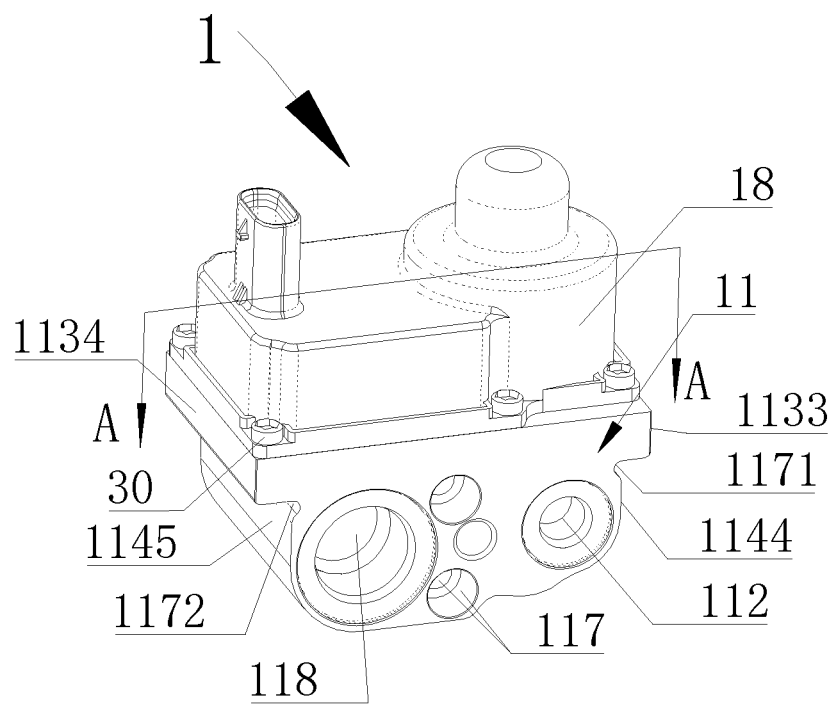
FIG. 3 is a perspective view of an electric valve from one direction provided by the present disclosure.
Figure 4:
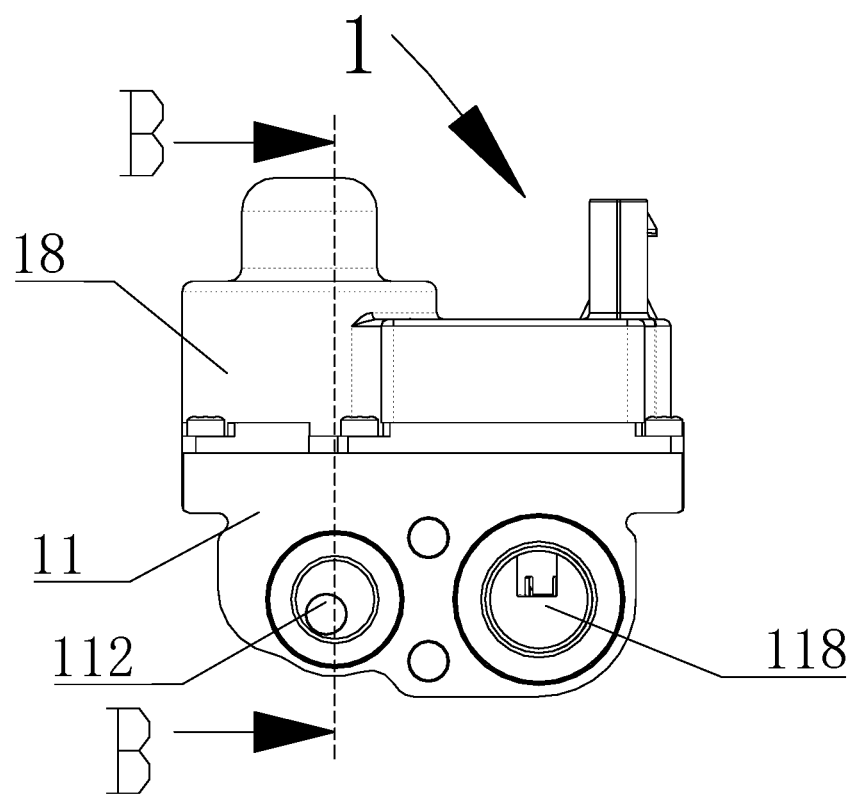
FIG. 4 is a front view of the electric valve of FIG. 3.
Figure 5:
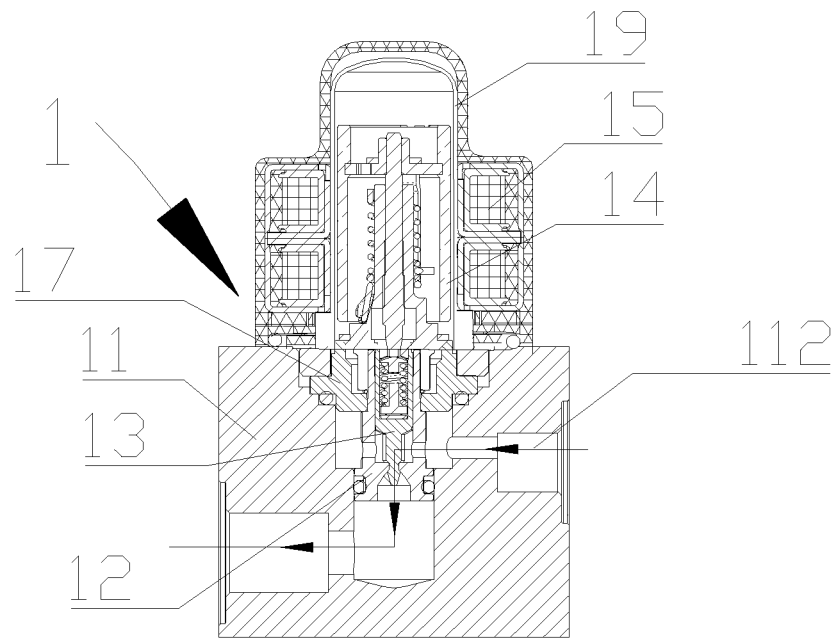
FIG. 5 is a cross-sectional view taken along a line B-B of the electric valve of FIG. 4.

Referring to FIG. 3 to FIG. 13, in some embodiments, the valve body 11 includes a first mounting portion 111 and a first flow passage 112, the first flow passage 112 is capable of allowing a working medium to flow therethrough, the first mounting portion 111 has a first cavity 1110, and the first cavity 1110 is communicated with the first flow passage 112. In conjunction with FIG. 4 and FIG. 5, in some embodiments, at least part of the valve base 12 is located in the first cavity 1110. In this embodiment, the first flow passage 112 is composed of flow passages of different calibers, and apparently, the first flow passage 112 may also be composed of flow passages of a same caliber. Referring to FIG. 4 and FIG. 5, in some embodiments, the electric valve 1 further includes a fixing member 17, a sleeve 19 covers a periphery of the rotor assembly 14 the sleeve 19 is fixed to the fixing member 17 by welding, and the valve base 12 is fixedly connected to the fixing member 17, that is, the sleeve 19 is connected to the valve base 12 through the fixing member 17, which facilitates simplification of a mold, miniaturizes the mold, and facilitates forming of the valve base 12. Apparently, the fixing member 17 may also be integrally formed with the valve base 12, such that the connection between the fixing member 17 and the valve base 12 does not need to be set again. In this embodiment, the valve port 120 on the valve base 12 communicates with the first flow passage 112 located on two sides of the valve port 120, and the spool 13 changes a flow cross-sectional area of the first flow passage 112 at the valve port 120 by moving towards and away from the valve port 120, thereby forming throttling at the valve port 120.

Figure 15:
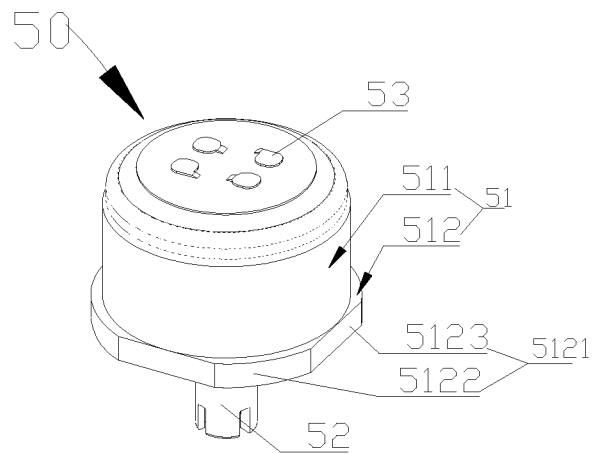
FIG. 15 is a perspective view of a sensor of FIG. 6.

Referring to FIG. 3 to FIG. 14, in some embodiments, the valve body 11 further includes a second mounting portion 119 and a second flow passage 118, the second mounting portion 119 has a second cavity 1190, and the second cavity 1190 is communicated with the second flow passage 118. The electric valve 1 further includes a sensor 50, at least part of the sensor 50 is located in the second cavity 1190, the sensor 50 is electrically connected and/or signal-connected to the circuit board 16, and the sensor 50 is used for detecting the pressure and/or the temperature of the working medium in the second cavity. In some embodiments, referring to FIG. 15, the sensor 50 includes a body 51, a sensing head 52, and a first abutment portion 53, the sensing head 52 is fixed to the body 51, and the first abutment portion 53 is electrically connected and/or signal-connected to a circuit of the sensor 50. In conjunction with FIG. 6, in some embodiments, at least part of the sensing head 52 is located in the second flow passage 118 or the second cavity 1190, and the sensing head 52 is capable of sensing relevant parameters of the working medium in the second flow passage 118 or the second cavity 1190, such as the temperature and/or pressure of the working medium. The first abutment portion 53 is disposed on an upper surface of the body 51 and is fixedly connected to the upper surface of the body 51, or the first abutment portion 53 is formed on the upper surface of the sensor body 51. In this embodiment, an upper surface of the first abutment portion 53 is formed with a conductive layer, where the conductive layer may be a tin coating layer, being processed by electroless nickel plating or gold immersion, or the like, thereby facilitating electrical conduction or signal transmission between the circuit board 16 and the sensor 50 in FIG. 6 through the conductive layer. Apparently, the first abutment portion 53 may be made into a single component and then fixedly connected to the sensor 50. In this case, the first abutment portion 53 may be a conductive metal sheet or other electrically conductive structures.

Figure 6:
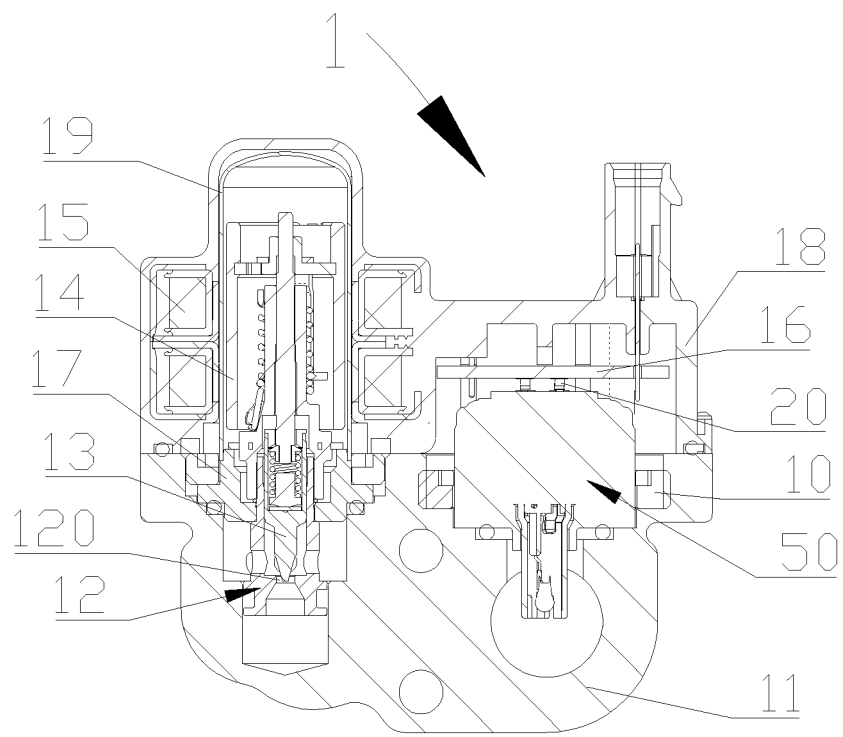
FIG. 6 is a cross-sectional view taken along a line A-A of the electric valve of FIG. 3.
Figure 7:
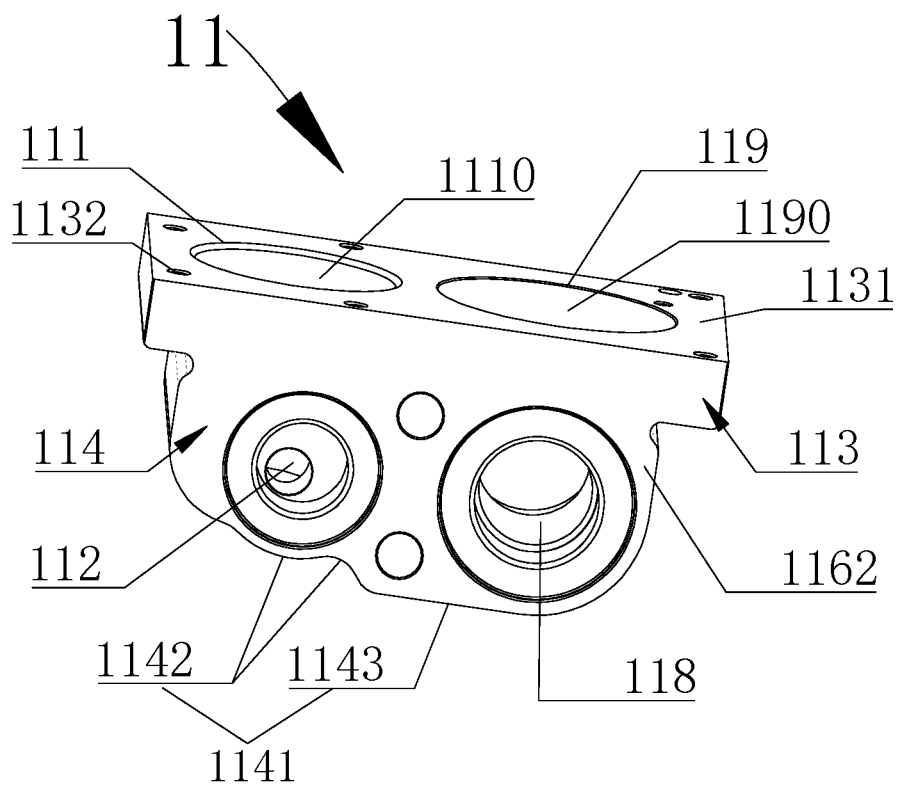
FIG. 7 is a perspective view of a valve body of FIG. 3 to FIG. 6 from one direction.

Referring to FIG. 6, in some embodiments, the sensor 50 is fixedly connected to and located in the valve body 11. In some embodiments, referring to FIG. 6, FIG. 8, FIG. 14, and FIG. 15, the body 51 of the sensor 50 includes a main body portion 511 and a limiting portion 512, and at least part of the limiting portion 512 protrudes from an outer edge of the main body portion 511. The main body portion 511 of the sensor is closer to the circuit board 16 than the limiting portion 512 of the sensor along an axial direction of the second mounting portion 119. The limiting portion 512 is a non-rotating body and includes a limiting surface 5121, and the limiting surface 5121 is arranged along a circumferential direction of the limiting portion 512.

Figure 8:
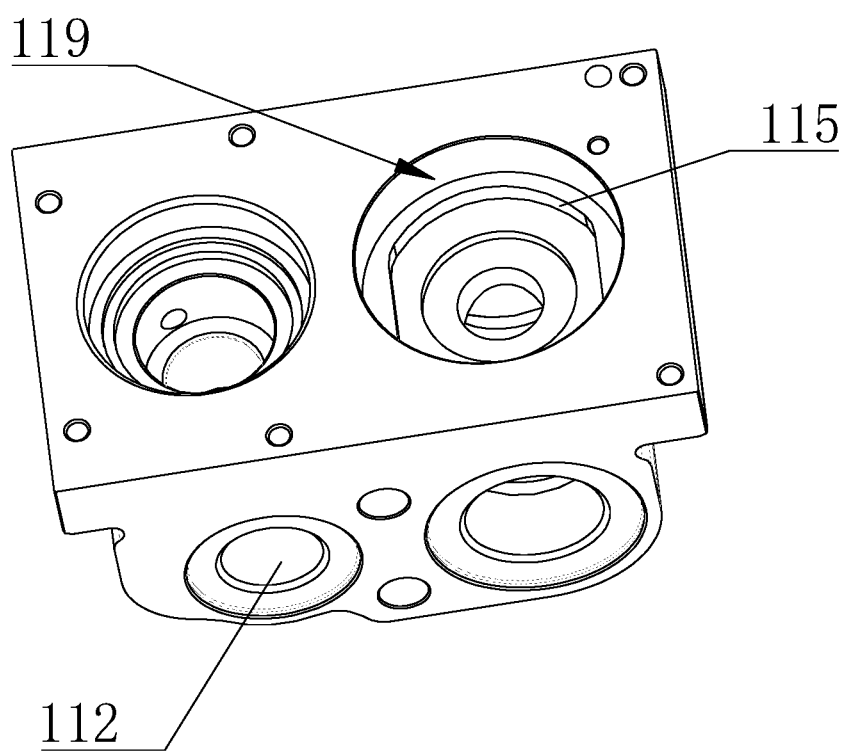
FIG. 8 is a perspective view of the valve body of FIG. 3 to FIG. 6 from another direction.
Figure 12:
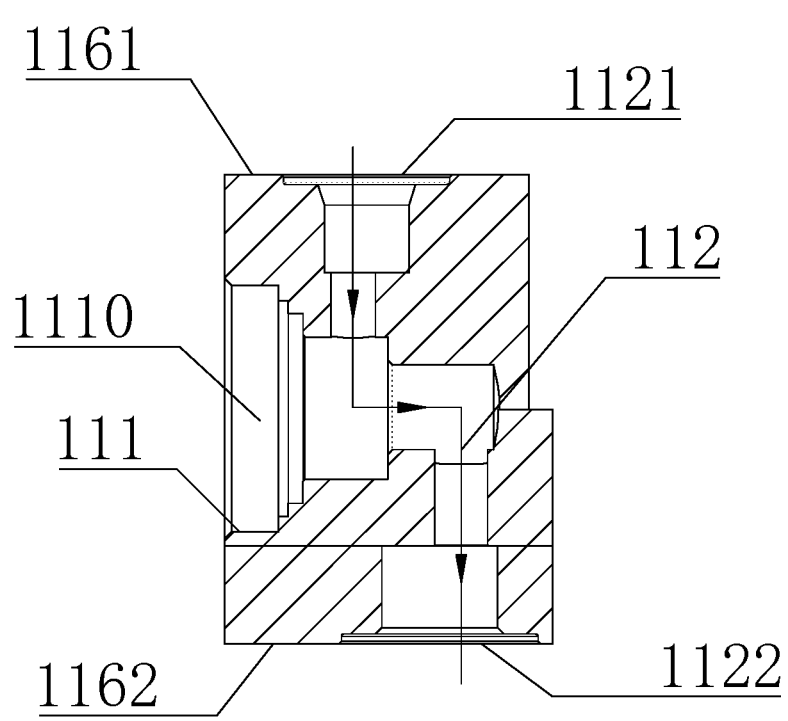
FIG. 12 is a cross-sectional view taken along a line C-C of the electric valve of FIG. 11.

In this embodiment, the limiting surface 5121 includes a cambered surface 5122 and a flat surface 5123. Referring to FIG. 6, it could be understood that when the limiting portion 512 is located in the second cavity 1190 of the valve body, since the limit portion 512 is a non-rotating body, the sensor 50 cannot rotate. Apparently, a structure of the limit portion can be varied as long as rotation of the sensor can be prevented. For example, the limiting portion 512 is a square, an ellipse or in other shapes. Accordingly, referring to FIG. 8 and FIG. 14, in some embodiments, the second mounting portion 119 includes a first fitting portion 115, and the first fitting portion 115 includes a fitting surface formed on a side wall of the first fitting portion 115. In conjunction with FIG. 6, in some embodiments, after the sensor 50 is assembled with the valve body 11, the fitting surface of the first fitting portion 115 is fitted with and abuts against the limiting surface 5121 of the limiting portion 512, thus facilitating defining the rotation of the sensor 50 relative to the valve body 11, thereby facilitating ensuring a position of the sensor 50 relative to the valve body 11 and a position of the sensor 50 relative to the circuit board 16. Referring to FIG. 6, FIG. 8 and FIG. 12, the electric valve 1 further includes a first compression nut 10, and the first compression nut 10 presses against part of the limiting portion 512 of the sensor that protrudes from the main body portion 511 of the sensor. In some embodiments, referring to FIG. 14, the second mounting portion 119 further includes a second fitting portion 116, the second fitting portion 116 is closer to an opening of the second mounting portion 119 than the first fitting portion 115, an inner circumferential surface of the second fitting portion 116 is provided with an internal thread, and an outer circumferential surface of the first compression nut 10 is formed with an external thread, such that the external thread of the first compression nut 10 engages with the internal thread of the second fitting portion 116, thereby enabling the first compression nut 10 to press the limiting portion 512 of the sensor 50, thereby connecting the sensor 50 to the valve body 11.

Referring to FIG. 6, in some embodiments, the sensor 50 is electrically connected and/or signal-connected to the circuit board 16. In some embodiments, the electric valve 1 further includes a connecting member 20, the connecting member 20 is electrically conductive and disposed between the sensor 50 and the circuit board 16. In some embodiments, referring to FIG. 16 and FIG. 17, the connecting member 20 includes a first connecting end 21 and a second connecting end 22, the first connecting end 21 is fixedly connected to the circuit board 16 in FIG. 6, and the second connecting end 22 abuts against the first abutment portion 53 of the sensor 50 in FIG. 6. In this way, through the arrangement of the connecting member 20, the sensor 50 can be electrically connected and/or signal-connected to the circuit board 16. In this way, on one hand, no wire is needed for connecting the sensor 50 to the circuit board 16; and on the other hand, relatively reducing wire arrangement is facilitated, thereby facilitating assembly of the sensor and the circuit board.

Figure 16:
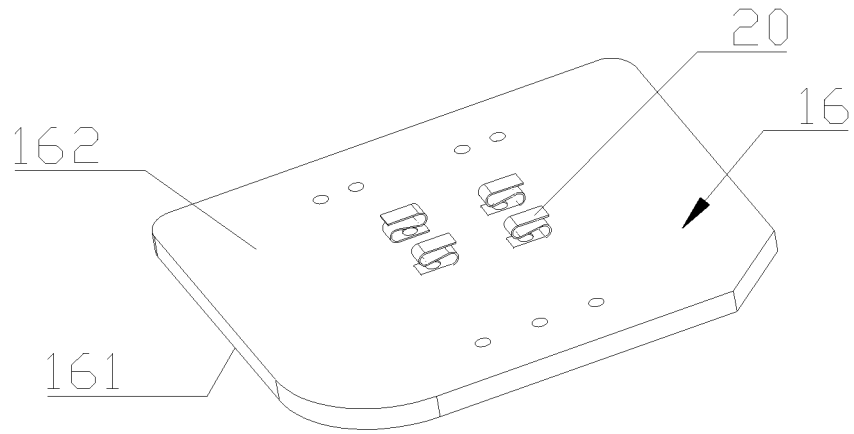
FIG. 16 is a perspective view of a circuit board of FIG. 6 combined with a connecting member.

Referring to FIG. 16, in some embodiments, the circuit board 16 includes a first surface 161 and a second surface 162 disposed opposite to the first surface 161, the second surface 162 faces towards the valve body; or in an axial direction of the second mounting portion 119, the second surface 162 of the circuit board 16 is closer to the sensor 50 than the first surface 161 of the circuit board 16. It will be understood that electronic components of the circuit board 16 are disposed on the first surface 161 of the circuit board 16 and/or on the second surface 162 of the circuit board 16. In this embodiment, the first connecting end 21 of the connecting member 20 is fixedly connected to the second surface 162 of the circuit board, and the first connecting end 21 of the connecting member 20 is fixedly connected to the circuit board 16 by welding, such that the connecting member 20 and the circuit board 16 can be connected and fixed together in a mode of surface patches, thus facilitating simplifying the assembly process of the connecting member 20.

Referring to FIG. 6, and FIG. 15 to FIG. 17, in some embodiments, when the connecting member 20 is orthogonally projected to the first abutment portion 53 of the sensor 50, at least part of a projection of the first connecting end 21 of the connecting member 20 is located within the first abutment portion 53 of the sensor 50, such that ensuring contact between the connecting member 20 and the sensor 50 is facilitated, thereby facilitating the improvement of the reliability of the electrical connection and/or the signal connection between the connecting member 20 and the sensor 50. In addition, in this embodiment, at least part of a projection of the second connecting end 22 of the connecting member 20 is also located within the first abutment portion 53 of the sensor 50. In this embodiment, a position of the first abutment portion 53 of the sensor 50 corresponds to a position of the second surface 162 of the circuit board 16 fixing the connecting member 20; or when the first abutment portion 53 is orthogonally projected to the second surface 162 of the circuit board 16, and at least half of the projection of the first abutment portion 53 is located within a region where the connecting member 20 is fixed to the second surface 162 of the circuit board 16, which facilitates reducing inclination of the connecting member 20, thereby facilitating improvement of the reliability of the contact between the connecting member 20 and the circuit board 16 and between the connecting member 20 and the sensor 50.

Figure 17:
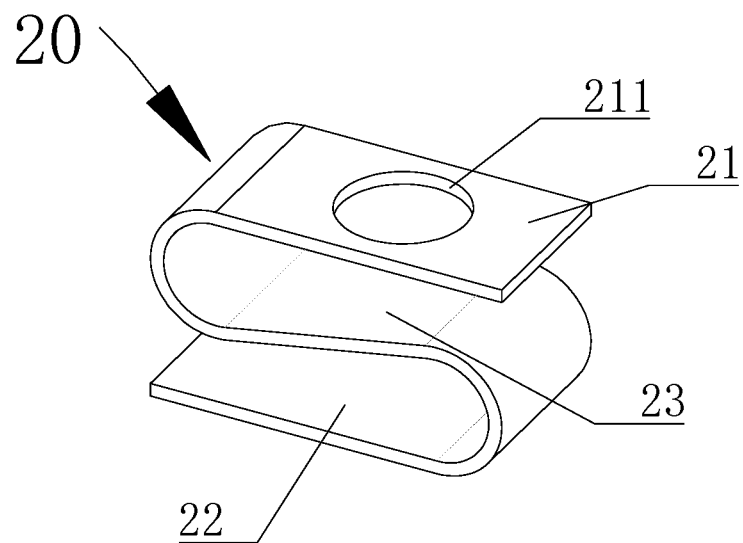
FIG. 17 is a perspective view of the connecting member of FIG. 6 or FIG. 16.

Referring to FIG. 6, FIG. 16 and FIG. 17, in some embodiments, the connecting member 20 is disposed adjacent to a center of the circuit board 16, which facilitates the relative stability of the circuit board 16. In this embodiment, the connecting member 20 is an elastic element, one end of the elastic element is fixedly connected to the circuit board 16, and the other end of the elastic element abuts against the first abutment portion 53 of the sensor 50. When the elastic element is fixed, the elastic element is compressed and deformed by the circuit board 16, and the elastic element is elastically deformed; or a length of the elastic element between the circuit board 16 and the sensor 50 is less than a length of the elastic element in a natural state, which facilitates improving the reliability of the contact between the connecting member 20 and the sensor 50. In some embodiments, the length of the elastic element between the circuit board 16 and the sensor 50 is 0.7 to 0.8 times the length of the elastic element in the natural state. In this way, on the premise of ensuring reliable contact between the connecting member 20 and the sensor 50, it is beneficial to relatively control an elastic force of the elastic element, thus facilitating reducing a counter-acting force of the elastic element acting on the circuit board 16.

Referring to FIG. 16, in some embodiments, the connecting member 20 includes two or more elastic elements. In this embodiment, the connecting member 20 includes four elastic elements, the four elastic elements are disposed on the second surface 162 of the circuit board 16 at intervals, and the four elastic elements are fixed to the circuit board 16 by welding and electrically connected and/or signal-connected to the circuit board 16. Referring to FIG. 16 and FIG. 17, in some embodiments, the first connecting end 21 and the second connecting end 22 are plate-shaped, the first connecting end 21 is disposed to be relatively parallel to the second connecting end 22, the first connecting end 21 has a through hole 211, and the through hole 211 penetrates through an upper surface and a lower surface of the first connecting end 21. In this way, when the elastic element is fixed to the circuit board 16 by welding, a contact area between solder and the elastic element can be increased, thus facilitating improving the reliability of the connection between the elastic element and the circuit board. Apparently, the elastic element may also be other elastic elements such as a spring, a resilient piece or a leaf spring.

Referring to FIG. 17, in some embodiments, the elastic element further includes a middle portion 23, and the middle portion 23 is plate-shaped and disposed between the first connecting end 21 and the second connecting end 22. The first connecting end 21, the middle portion 23 and the second connecting end 22 are disposed in sequence and at intervals; or a certain distance is provided between the first connecting end 21 and the middle portion 23, and a certain distance is provided between the second connecting end 22 and the middle portion 23. The middle portion 23 and the first connecting end 21 are connected and smoothly transitioned through a circular arc, and the middle portion 23 and the second connecting end 22 are connected and smoothly transitioned through a circular arc, such that elastic deformation of the elastic element is facilitated. In addition, in this embodiment, a certain angle is provided between the middle portion 23 and the first connecting end 21, which facilitates the elastic deformation of the elastic element. In this embodiment, the elastic element includes only one middle portion 23. Apparently, two or more middle portions 23 may also be provided between the first connecting end 21 and the second connecting end, and the adjacent middle portions are connected end to end.

Referring to FIG. 6, FIG. 14, FIG. 16, and FIG. 18, in some embodiments, the electric valve 1 further includes a cover body 18 covering and arranged over the circuit board 16. When the connecting member 20 abuts against the sensor 50, the connecting member 20 will generate a counter-acting force and the counter-acting force is acted on the circuit board 16 such that the circuit board 16 is susceptible to deformation. In order to eliminate the counter-acting force of the connecting member 20 acted on the circuit board 16 and enhance the stability of the circuit board 16, the cover body 18 is provided with a support portion 181. The support portion 181 protrudes from an inner surface of the cover body 18 to a direction facing away from the inner surface of the cover body 18, and the support portion 181 is disposed above the circuit board 16 in the axial direction of the second mounting portion 119. Referring to FIG. 16, in some embodiments, the support portion 181 includes a body 1811 of the support portion and a protrusion portion 1812, the body 1811 of the support portion is connected to the cover body 18, and the protrusion portion 1812 protrudes from an upper surface of the body 1811 of the support portion to a direction facing away from the upper surface of the body 1811 of the support portion. In this embodiment, the support portion 18 includes two protrusion portions 1812, the protrusion portions 1812 are cylindrical, and apparently, the protrusion portions 1812 may also be squares, diamonds or in other shapes. In some embodiments, it is defined that the connecting member 20 surrounds a first region, and the protrusion portion 1812 is located near a center of the first region, which facilitates the relative stability of the circuit board 16. In this embodiment, the support portion 181 includes the body 1811 of the support portion and the protrusion portion 1812. Apparently, the support portion 181 may include only the body 1811 of the support portion or only the protrusion portion 1812. In addition, in this embodiment, the protrusion portion 1812 is perpendicular to the first surface 161 of the circuit board 16, the protrusion portion 1812 is in contact with the first surface 161 of the circuit board 16, the support portion 181 and the connecting member 20 are located on two sides of the circuit board 16, respectively, and the support portion 181 is used to counteract an elastic force of the connecting member 20 acted on the circuit board 16. In this embodiment, the protrusion portion 1812 abuts against the first surface 161 of the circuit board 16, a contact position of the protrusion portion 1812 with the first surface 161 of the circuit board 16 is disposed in one-to-one correspondence with a position of the first connecting end 21 of the connecting member 20 on the second surface 162 of the circuit board 16, or the contact position of the protrusion portion 1812 with the first surface 161 is located within the region surrounded by the first connecting end 21 of the connecting member 20, which facilitates relative stability of the circuit board. In this embodiment, the support portion 181 is integrally formed with the cover body 18, and apparently, the support portion 181 may be singly processed into a component and then fixedly connected to the cover body.

Figure 18:
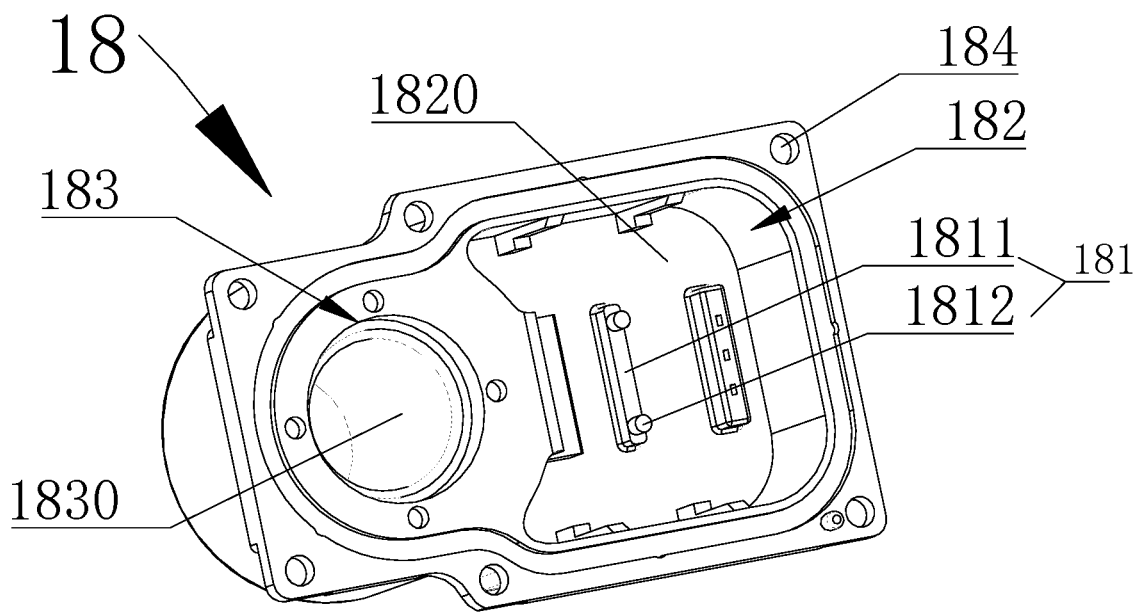
FIG. 18 is a perspective view of a cover body of FIG. 3 to FIG. 6.

Referring to FIG. 6 and FIG. 18, in some embodiments, with reference to the valve body 11, the cover body 18 is disposed above the valve body 11, the cover body 18 covers a periphery of the circuit board 16 and a periphery of the rotor assembly 14, and the cover body 18 is detachably connected to the valve body 11. In this embodiment, the cover body 18 is formed by injection molding with the stator assembly 15 as an insert piece, which facilitates limiting the stator assembly 15. Apparently, the stator assembly 15 may not be limited by injection molding, but be limited by providing a limiting structure in the electric valve 1. Referring to FIG. 16, in some embodiments, the cover body 18 includes a first accommodation portion 182 and a second accommodation portion 183, the first accommodation portion 182 is formed with a first accommodation cavity 1820, the second accommodation portion 183 is formed with a second accommodation cavity 1830, and the first accommodation cavity 1820 is not communicated with the second accommodation cavity 1830. In conjunction with FIG. 4 and FIG. 5, in some embodiments, the circuit board 16 is disposed in the first accommodation cavity 1820, and the rotor assembly 14 is disposed in the second accommodation cavity 1830. In conjunction with FIG. 6, in this embodiment, at least part of the sensor 50 and the connecting member 20 are located in the first accommodation cavity 1820, which facilitates a compact structure.

Figure 19:
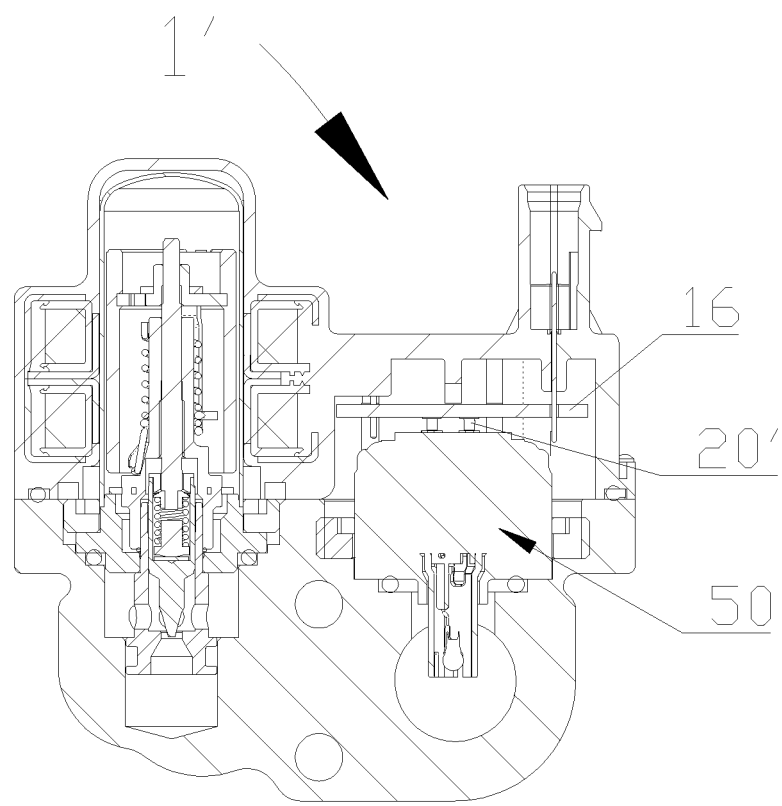
FIG. 19 is a cross-sectional view taken along a line A-A of the electric valve of FIG. 3 according to another embodiment provided by the present disclosure.
Figure 20:
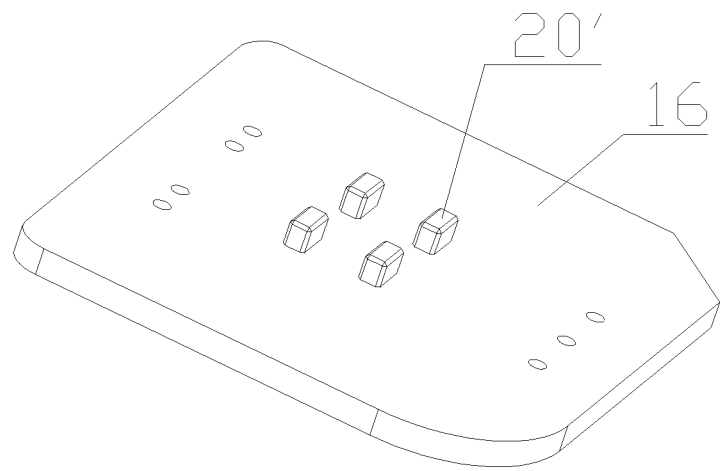
FIG. 20 is a perspective view of a circuit board of FIG. 19 combined with a connecting member.
Figure 21:
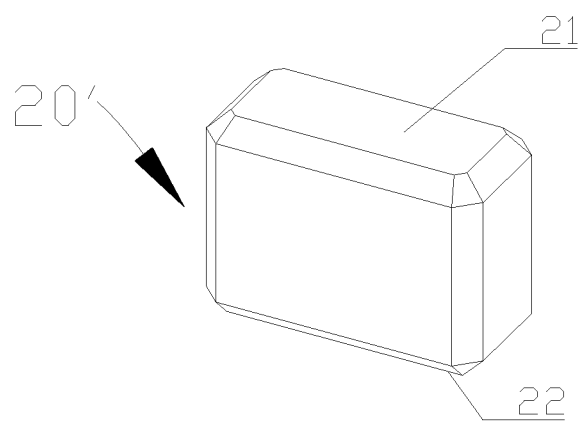
FIG. 21 is a perspective view of the connecting member of FIG. 19 or FIG. 20.

Referring to FIG. 19 to FIG. 21, FIG. 19 is a structure diagram of an electric valve according to another embodiment, and FIG. 21 is a structure diagram of a connecting member according to a the other embodiment. The structure of the connecting member in the other embodiment will be described below.

Figure 13:
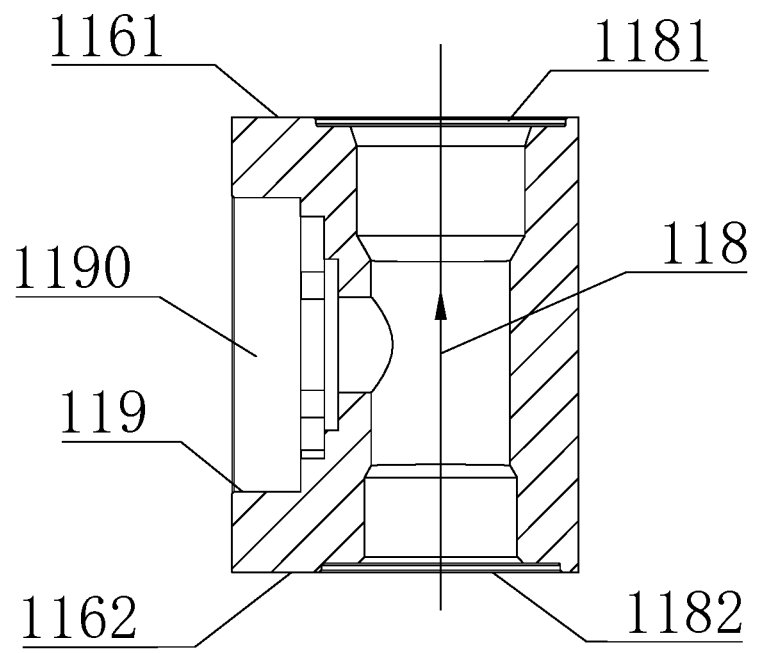
FIG. 13 is a cross-sectional view taken along a line D-D of the electric valve of FIG. 11.
Figure 14:
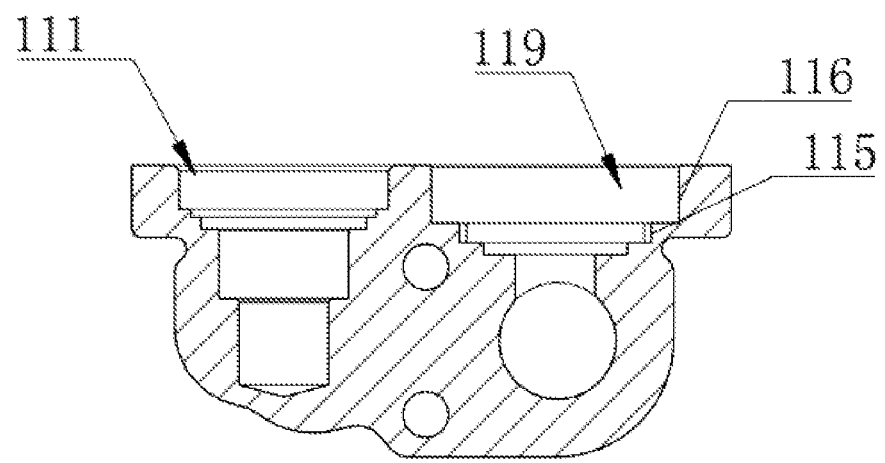
FIG. 14 is a cross-sectional view taken along a line E-E of the electric valve of FIG. 11.

Referring to FIG. 19 to FIG. 21, in some embodiments, the electric valve 1' includes a sensor 50, a circuit board 16, and a connecting member 20' disposed between the sensor 50 and the circuit board 16. The connecting member 20' includes a first connecting end 21' and a second connecting end 22', the first connecting end 21' is fixedly connected to the circuit board 16, and the second connecting end 21' abuts against the sensor 50. Compared with the connecting member of the above embodiment, in this embodiment, the connecting member 20' is a rigid element, the electric valve 1' includes four connecting members 20', and heights of the four connecting members 20' typically have a certain tolerance during the processing of the connecting members 20'. Referring to FIG. 13, in some embodiments, in order to ensure reliable contact between the connecting members 20' and the sensor 50, four first abutment portions 53 of the sensor 50 may be machined into first abutment portions of different heights according to the heights of the connecting member 20'. Other features of the connecting member in this embodiment may be referred to the connecting member of the above embodiment, which will not be repeated herein.

The structure of the valve body in the above-mentioned two embodiments will be described in detail below.

Figure 9:
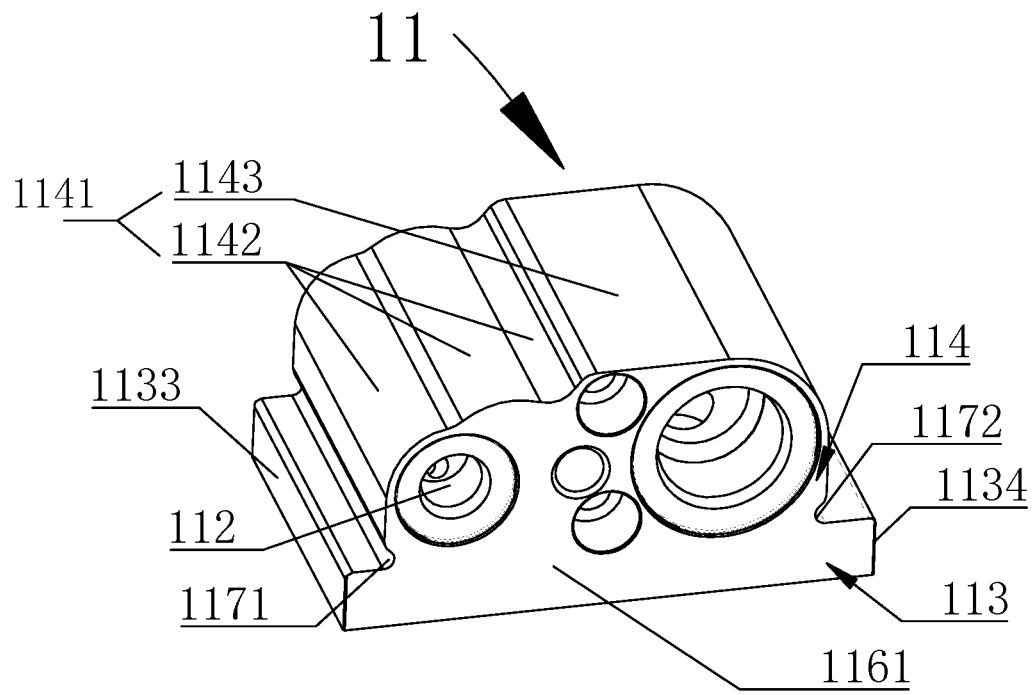
FIG. 9 is a perspective view of the valve body of FIG. 3 to FIG. 6 from still another direction.
Figure 10:
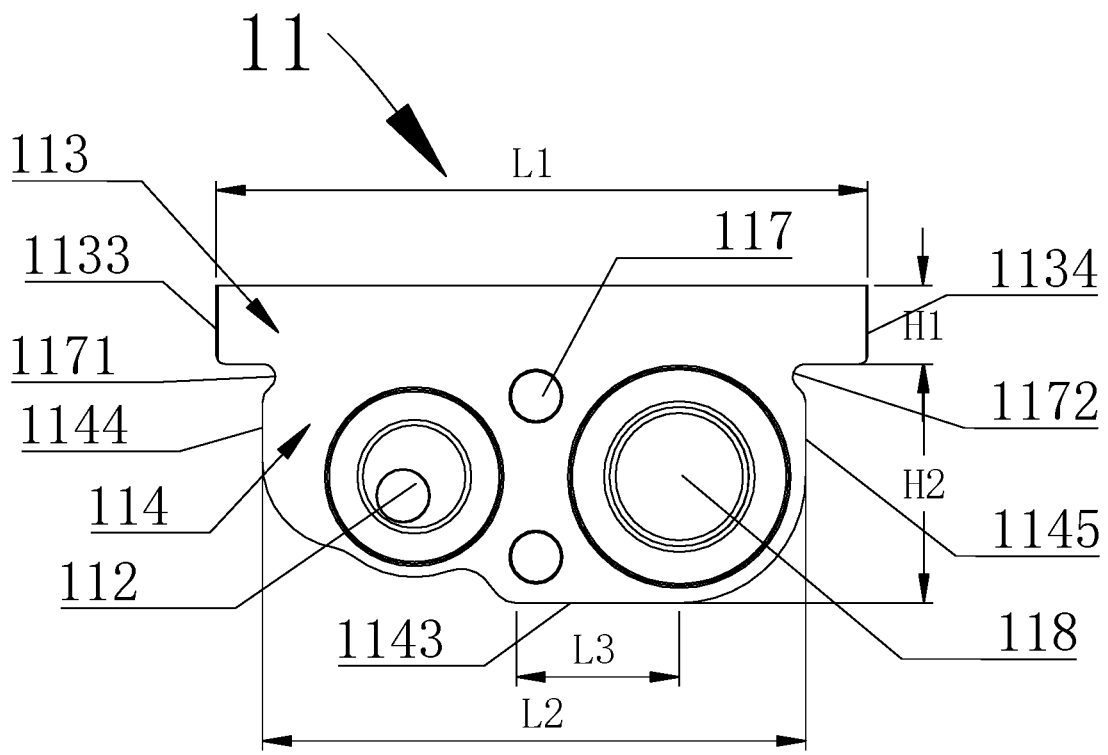
FIG. 10 is a front view of the valve body of FIG. 7, FIG. 8 or FIG. 9 in one direction.

Referring to FIG. 7 to FIG. 10, in some embodiments, the valve body 11 includes a first portion 113 and a second portion 114, the first portion 113 and the second portion 114 are an integral structure, and with reference to the first portion 113, the second portion 114 is located below the first portion 113. In conjunction with FIG. 2 to FIG. 5, in some embodiments, an upper surface 1131 of the first portion 113 is disposed in contact with and detachably connected to the cover body 18. In this embodiment, the valve body 11 is connected to the cover body 18 through a first screw 20. In some embodiments, referring to FIG. 7, the first portion 113 of the valve body 11 is formed with a threaded hole 1132. Referring to FIG. 18, in some embodiments, the cover body 18 is formed with a communication hole 184 that penetrates through an upper surface and a lower surface of the cover body 18. In conjunction with FIG. 3, in some embodiments, the first screw 30 is mounted in a direction from the cover body 18 to the valve body 11 by passing through the communication hole 184 and is threadedly connected to the valve body 11. Referring to FIG. 10, in this embodiment, a length L1 of the first portion 113 is greater than a length L2 of the second portion 114, such arrangement facilitates a relative reduction of the weight of the valve body, thereby facilitating a reduction of a total weight of the electric valve and facilitating light weight of the electric valve.

Referring to FIG. 7 to FIG. 11, in some embodiments, the second portion 114 includes a first wall 1161 and a second wall 1162, and the first wall 1161 is disposed opposite to the second wall 1162. In this embodiment, the first wall 1161 is disposed relatively parallel to the second wall 1162. Referring to FIG. 7 to FIG. 12, in some embodiments, the first flow passage 112 includes a first open end 1121 and a second open end 1122, the first open end 1121 is communicated with the second open end 1122, at least part of the first open end 1121 is located on the first wall 1161, and at least part of the second open end 1122 is located on the second wall 1162. In this embodiment, the first open end 1121 is used for allowing the fluid to enter, and the second open end 1122 is used for allowing the fluid to flow out. Referring to FIG. 10, in some embodiments, the first portion 113 includes a first side wall 1133 and a second side wall 1134, and the first side wall 1133 is disposed opposite to the second side wall 1134. In this embodiment, the first side wall 1133 is disposed opposite to and parallel to the second side wall 1134, and the first side wall 1133 and the second side wall 1134 are located on two sides of the valve body 11, respectively. Referring to FIG. 10, in some embodiments, the second portion 114 further includes a third wall 1144, the first side wall 1133 and the third side wall 1144 are located on a same side of the valve body 11, and neither the third wall 1144 nor the first side wall 1133 has the first open end 1121 or the second open end 1122. In some embodiments, a reference plane is defined, the reference plane is located between the first side wall 1133 and the second side wall 1134, and the reference plane is disposed parallel to the first side wall 1133 or the second side wall 1134. The first wall 1161 is taken as a front surface, the valve body 11 is projected to the front surface, and a first connecting line is defined. The first connecting line is a connecting line from a midpoint of a projection of the first side wall 1133 to a midpoint of a projection of the second side wall 1134. The reference plane coincides with a midpoint of the first connecting line, and at least part of the third wall 1144 is disposed closer to the reference plane than the first side wall 1133. On one hand, the connection between the cover body 18 and the first portion 113 of the valve body 11 can be ensured; and on the other hand, the third wall 1144 of the second portion 114 is disposed closer to the reference plane than the first side wall 1133 of the first portion 113, which facilitates reducing the weight of the valve body, thereby facilitating light weight of the electric valve.

Referring to FIG. 10, in some embodiments, the second portion 114 further includes a fourth wall 1145, and the fourth wall 1145 is disposed opposite to the third wall 1144. In this embodiment, a main body segment of the third wall 1144 and a main body segment of the fourth wall 1145 are planar, the main body segment of the fourth wall 1145 is disposed parallel to the main body segment of the third wall 1144, the fourth wall 1145 and the third wall 1144 are located on two sides of the valve body 11, respectively, and the fourth wall 1145 and the second side wall 1134 of the first portion 113 are located on a same side of the valve body 11. At least part of the fourth wall 1145 is disposed closer to the reference plane of the valve body than the second side wall 1134. The fourth wall 1145 of the second portion 114 is disposed closer to the reference plane than the second side wall 1134 of the first portion 113, which facilitates reducing the weight of the valve body, thus facilitating the light weight of the electric valve.

Referring to FIG. 9 and FIG. 10, in some embodiments, the second portion 114 further includes a first recessed portion 1171, the first recessed portion 1171 is recessed from the third wall 1144 and is located at a transitional junction of the first portion 113 and the second portion 114, which facilitates preventing stress from concentrating at the junction of the first portion 113 and the second portion 114. Apparently, the first recessed portion 1171 may also be located on the third wall 1144, and a distance from the first recessed portion 1171 on the third wall 1144 to the reference plane is less than a distance from the first side wall 1133 to the reference plane. In this solution, the first recessed portion 1171 is provided such that facilitates reducing the weight of the valve body, thereby facilitating the light weight of the electric valve.

Referring to FIG. 9 and FIG. 10, in some embodiments, the second portion 114 further includes a second recessed portion 1172, the second recessed portion 1172 is recessed from the fourth wall 1145, the second recessed portion 1172 is located on the fourth wall 1145 or at a transitional junction of the first portion 113 and the second portion 114, which facilitates preventing stress from concentrating at the junction of the first portion 113 and the second portion 114. Apparently, the second recessed portion 1172 may also be located on the fourth wall 1145, and a distance from the second recessed portion 1172 on the fourth wall 1145 to the reference plane is less than a distance from the second side wall 1134 to the reference plane. In this solution, the second recessed portion 1172 is provided such that facilitates reducing the weight of the valve body, thereby facilitating the light weight of the electric valve.

In this solution, the first recessed portion 1171 and the second recessed portion 1172 are provided, on one hand, it is advantageous to reduce the weight of the valve body; and on the other hand, it is advantageous for an external clamp to clamp the valve body 11 when the valve body 11 is processed, thereby facilitating the manufacture and processing of the valve body 11. In some embodiments, referring to FIG. 7 to FIG. 10, along an extension direction of the third wall 1144 of the second portion 114, the first recessed portion 1171 and the second recessed portion 1172 penetrate through the first wall 1161 and the second wall 1162 of the valve body 11, and a minimum distance from an edge of the first recessed portion 1171 and/or an edge of the second recessed portion 1172 to an outer edge of the first flow passage 112 is greater than or equal to 1.5 mm. In this way, it can be ensured that the first recessed portion 1171 and the second recessed portion 1172 will not damage the structure of the first flow passage 112. In this embodiment, the first recessed portion 1171 and the second recessed portion 1172 are symmetrically disposed with respect to the reference plane, the first recessed portion 1171 is smoothly transitioned to and connected to the third wall 1144 through a circular arc, and the second recessed portion 1172 is smoothly transitioned to and connected to the fourth wall 1145 through a circular arc. In some embodiments, the valve body 11 is cross-sectioned along a direction parallel to the first wall 1161 to obtain a cross-section of the valve body, a cross-sectional shape of the first recessed portion 1171 and a cross-sectional shape of the second recessed portion 1172 are arc-shaped, and a diameter of the first recessed portion 1172 and a diameter of the second recessed portion 1172 are greater than or equal to 3 mm, which is advantageous to ensure a clamping force of the external clamp when the valve body 11 is machined, thereby facilitating the manufacture and machining of the valve body.

Referring to FIG. 7 to FIG. 10, in some embodiments, the first portion 113 and the second portion 114 are cross-sectioned along a direction parallel to the first wall 1161, so as to obtain a cross-section of the first portion 113 and a cross-section of the second portion 114, an outer profile of the cross-section of the first portion 113 is a rectangle, and an outer profile of the cross-section of the second portion 114 is an irregular shape. The shape of the second portion is changed and the amount of material used in the valve body is reduced, which is advantageous to reduce the weight of the valve body 11, thereby facilitating reduction of the total weight of the electric valve and facilitating the light weight of the electric valve.

Referring to FIG. 7 to FIG. 10, in some embodiments, the second portion 114 includes a bottom wall 1141, the bottom wall 1141 includes a plane segment 1143, and the plane segment 1143 is disposed relatively parallel to the upper surface 1131 of the first portion 113. In this solution, the electric valve can be placed along the plane segment 1143 by providing the plane segment 1143 on the bottom wall 1141. Referring to FIG. 9 and FIG. 10, in some embodiments, the first wall 1161 is taken as the front surface, and the valve body 11 is projected to the front surface so as to obtain a projection of the valve body. A projection length L3 of the plane segment 1143 is greater than or equal to a quarter of a projection length L1 of the first portion 113 and is less than the projection length L1 of the first portion 113, that is, $L1 > L3 \geq \tfrac{1}{4}L1$, thus facilitating providing a reliable support for the electric valve when the electric valve is placed along the plane segment 1143.

Referring to FIG. 7 to FIG. 10, in some embodiments, the bottom wall 1141 further includes a cambered surface segment 1142, the cambered surface segment 1142 is closer to the first flow passage 112 than the plane segment 1143, and the cambered surface segment 1142 is smoothly transitioned to and connected to the plane segment 1143 through a circular arc, thereby facilitating avoiding stress concentration. The third wall 1144 is smoothly transitioned to and connected to the bottom wall 1141 through a circular arc, and the fourth wall 1145 is smoothly transitioned to and connected to the bottom wall 1141 through a circular arc, thereby facilitating avoiding stress concentration.

Referring to FIG. 5 and FIG. 10, in some embodiments, in a direction parallel to the movement of the spool 13, or in a direction perpendicular to the first wall 1161, a height H1 of the first portion 113 of the valve body 11 is less than a height H2 of the second portion 114. In some embodiments, the height of the first portion 113 is greater than or equal to 6 mm and is less than or equal to 18 mm. In this way, while ensuring the reliability of the screw connection between the valve body 11 and the cover body 18, the weight of the valve body is relatively reduced, thereby facilitating reducing the total weight of the electric valve and facilitating the light weight of the electric valve.

Referring to FIG. 10, in some embodiments, a minimum distance between an outer edge of the second portion 114 and the outer edge of the first flow passage 112 is greater than or equal to 1.5 mm, which ensures that the outer edge of the second portion 114 will not damage the structure of the first flow passage 112.

Referring to FIG. 13, in some embodiments, the second flow passage 118 includes a third open end 1181 and a fourth open end 1182, the third open end 1181 is communicated with the fourth open end 1182, the third open end 1181 is formed on the first wall 1161, and the fourth open end 1182 is formed on the second wall 1162. In this embodiment, the third open end 1181 is used for allowing the fluid to flow out, and the fourth open end 1182 is used for allowing the fluid to enter. In conjunction with FIG. 6, FIG. 7, FIG. 12 and FIG. 13, in this embodiment, the first open end 1121 of the first flow passage 112 (that is, an inflow port of the first flow passage 112) and the third open end 1181 of the second flow passage 118 (that is, an outflow port of the second flow passage 118) are disposed on a same side of the valve body 11, the second open end 1122 of the first flow passage 112 (that is, an outflow port of the first flow passage 112) and the fourth open end 1182 of the second flow passage 118 (that is, an inflow port of the second flow passage 118) are disposed on a same side of the valve body 11, and the above two sides are different sides of the valve body. In this way, when the electric valve is applied to a thermal management system, in conjunction with FIG. 1 and FIG. 2, since the electric valve needs to be integrated or assembled with the heat exchanger 500, the second open end 1122 of the first flow passage 112 of the electric valve (that is, the outflow port of the first flow passage 112) can be connected to an inlet of the heat exchanger 500, and an outlet of the heat exchanger 500 is connected to the third open end 1181 of the second flow passage 118 of the electric valve (that is, the outflow port of the second flow passage), thereby facilitating corresponding installation of the heat exchanger 500 with the electric valve. In this embodiment, the inflow port of the first flow passage 112 and the inflow port of the second flow passage 118 may also be disposed on different sides of the valve body, and the outflow port of the first flow passage 112 and the outflow port of the second flow passage 118 may also be disposed on different sides of the valve body. Apparently, according to needs of the electric valve in practical application, the inflow port of the first flow passage 112 and the inflow port of the second flow passage 118 may also be disposed on a same side of the valve body 11, and the outflow port of the first flow passage 112 and the outflow port of the second flow passage 118 may also be disposed on a same side of the valve body 11. In addition, referring to FIG. 7, in some embodiments, a minimum distance between the outer edge of the second portion 114 and an outer edge of the second flow passage 118 is greater than or equal to 1.5 mm, which ensures that the outer edge of the second portion 114 will not damage the structure of the second flow passage 118.

Referring to FIG. 7 to FIG. 13, in some embodiments, the first open end 1121 of the first flow passage 112 (that is, the inflow port of the first flow passage 112) and the third open end 1181 of the second flow passage 118 (that is, the outflow port of the second flow passage 118) are disposed on a same side of the valve body 11, the second open end 1122 of the first flow passage 112 (that is, the outflow port of the first flow passage) and the fourth open end 1182 of the second flow passage 118 (that is, the inflow port of the second flow passage 118) are disposed on a same side of the valve body 11, an opening of the first cavity 1110 of the first mounting portion 111 is located on a same side of the valve body 11, and the above-mentioned three sides are different sides of the valve body 11, which facilitates avoiding interference on the one hand, and improving a utilization rate of the valve body 11 on the other hand, thereby facilitating the miniaturization of the valve body.

Figure 11:
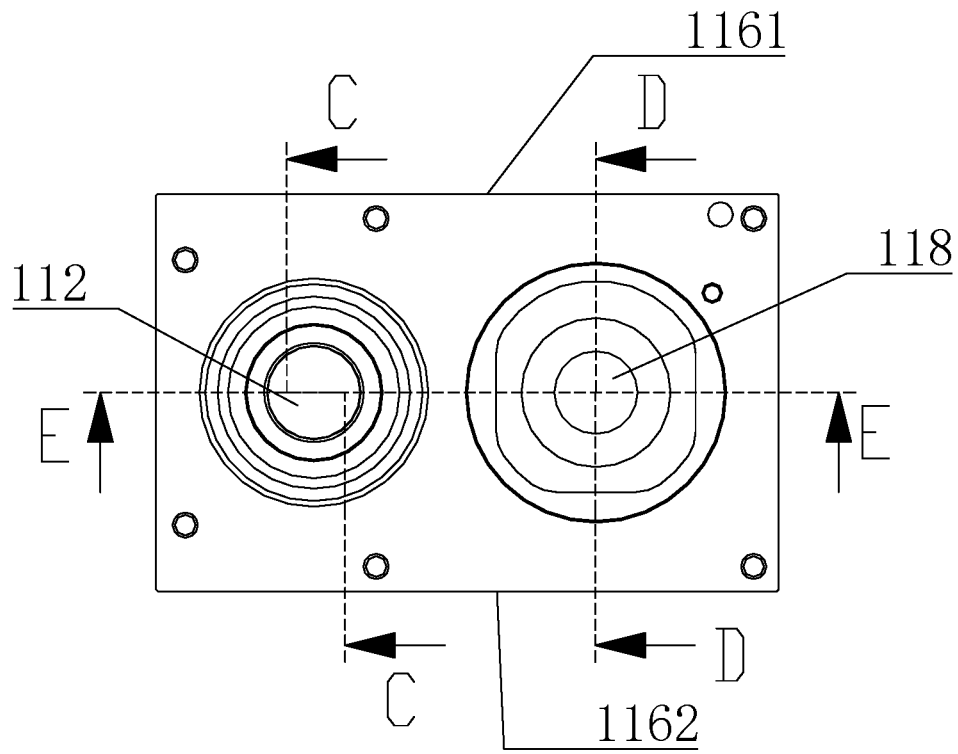
FIG. 11 is a front view of the valve body of FIG. 7, FIG. 8 or FIG. 9 in another direction.

Referring to FIG. 3, FIG. 10 and FIG. 11, in some embodiments, the valve body 11 further includes a mounting hole 117 penetrating through the first wall 1161 and the second wall 1162, and a minimum distance between the outer edge of the second portion 114 and an outer edge of the mounting hole 117 is greater than or equal to 1.5 mm, which ensures that the outer edge of the second portion 114 will not damage the structure of the mounting hole 117.

What is claimed is:

1. An electric valve, comprising a valve body, a circuit board and a cover body, wherein the cover body is disposed above the valve body, the circuit board is located in an inner cavity formed by the cover body or formed by the cover body and the valve body, and the cover body is fixedly connected to the valve body;

the valve body comprises a first portion and a second portion, the second portion is located below the first portion, the valve body is fixedly connected to the cover body through the first portion, the valve body has a first flow passage, the first flow passage comprises a first open end and a second open end, and the first open end is able to be communicated with the second open end;

the second portion comprises a first wall and a second wall, at least part of the first open end is located on the first wall, and at least part of the second open end is located on the second wall;

the first portion comprises a first side wall and a second side wall, and the first side wall and the second side wall are located on two sides of the valve body, respectively; and the second portion further comprises a third wall, the first side wall and the third wall are located on a same side of the valve body, neither the third wall nor the first side wall has the first open end or neither the third wall nor the first side wall has the second open end, and at least part of the third wall is disposed closer to a reference plane than the first side wall; wherein the reference plane is located between the first side wall and the second side wall and the reference plane is parallel to the first side wall or the second side wall, and the reference plane coincides with a midpoint of a first connecting line; wherein the first connecting line is a connecting line from a midpoint of a projection of the first side wall onto a plane where the first wall is located to a midpoint of a projection of the second side wall onto the plane where the first wall is located.

2. The electric valve of claim 1, wherein the second portion further comprises a first recessed portion located on the third wall or at a transitional junction of the first portion and the second portion, and a distance from the first recessed portion on the third wall to the reference plane is less than a distance from the first side wall to the reference plane.

3. The electric valve of claim 2, wherein the second portion further comprises a fourth wall disposed opposite to the third wall, the fourth wall and the third wall are located on two sides of the valve body, respectively, the fourth wall and the second side wall are located on a same side of the valve body, and at least part of the fourth wall is disposed closer to the reference plane than the second side wall.

4. The electric valve of claim 2, wherein the second portion comprises a bottom wall, the bottom wall comprises a plane segment disposed relatively parallel to an upper surface of the first portion; and in a projection of the valve body to the plane where the first wall is located, a projection length of the plane segment is greater than or equal to one quarter of a projection length of the first portion and is less than the projection length of the first portion.

5. The electric valve of claim 1, wherein the second portion further comprises a fourth wall disposed opposite to the third wall, the fourth wall and the third wall are located on two sides of the valve body, respectively, the fourth wall and the second side wall are located on a same side of the valve body, and at least part of the fourth wall is disposed closer to the reference plane than the second side wall.

6. The electric valve of claim 5, wherein the second portion further comprises a second recessed portion located on the fourth wall or at a transitional junction of the first portion and the second portion, and a distance from the second recessed portion on the fourth wall to the reference plane is less than a distance from the second side wall to the reference plane.

7. The electric valve of claim 6, wherein the first wall is disposed to be in parallel to the second wall; and in an extension direction of the third wall, the first recessed portion penetrates through the first wall and the second wall, the second recessed portion penetrates through the first wall and the second wall, and a minimum distance from an edge of at least one of the first recessed portion or the second recessed portion to an outer edge of the first flow passage is equal to or greater than 1.5 mm.

8. The electric valve of claim 7, wherein the first recessed portion and the second recessed portion are symmetrically disposed with respect to the reference plane, the first recessed portion is smoothly transitioned to and connected to the third wall through a circular arc, and the second recessed portion is smoothly transitioned to and connected to the fourth wall through a circular arc; and in a cross section of the valve body along a direction parallel to the first wall, a cross-sectional shape of the first recessed portion and a cross-sectional shape of the second recessed portion are circular arc-shaped, and a diameter of the first recessed portion and a diameter of the second recessed portion are greater than or equal to 3 mm.

9. The electric valve of claim 8, wherein the second portion comprises a bottom wall, the bottom wall comprises a plane segment disposed relatively parallel to an upper surface of the first portion; and in a projection of the valve body to the plane where the first wall is located, a projection length of the plane segment is greater than or equal to one quarter of a projection length of the first portion and is less than the projection length of the first portion.

10. The electric valve of claim 7, wherein the second portion comprises a bottom wall, the bottom wall comprises a plane segment disposed relatively parallel to an upper surface of the first portion; and in a projection of the valve body to the plane where the first wall is located, a projection length of the plane segment is greater than or equal to one quarter of a projection length of the first portion and is less than the projection length of the first portion.

11. The electric valve of claim 6, wherein the second portion comprises a bottom wall, the bottom wall comprises a plane segment disposed relatively parallel to an upper surface of the first portion; and in a projection of the valve body to the plane where the first wall is located, a projection length of the plane segment is greater than or equal to one quarter of a projection length of the first portion and is less than the projection length of the first portion.

12. The electric valve of claim 5, wherein the second portion comprises a bottom wall, the bottom wall comprises a plane segment disposed relatively parallel to an upper surface of the first portion; and in a projection of the valve body to the plane where the first wall is located, a projection length of the plane segment is greater than or equal to one quarter of a projection length of the first portion and is less than the projection length of the first portion.

13. The electric valve of claim 12, wherein the bottom wall further comprises a cambered surface segment, and the cambered surface segment is smoothly transitioned to and connected to the plane segment through a circular arc; and the third wall is smoothly transitioned to and connected to the bottom wall through a circular arc, the second portion further comprises a fourth wall, and the fourth wall is smoothly transitioned to and connected to the bottom wall through a circular arc.

14. The electric valve of claim 13, wherein the first portion and the second portion are an integrated structure; the valve body is connected to the cover body through a first screw, the first portion is formed with a threaded hole, the cover body is formed with a communicating hole, and the first screw is installed in a direction from the cover body to the valve body by passing through the communicating hole and is threadedly connected to the valve body; in a direction perpendicular to an extension direction of the first wall, a height of the first portion is less than a height of the second portion, wherein the height of the first portion is greater than or equal to 6 mm and is less than or equal to 18 mm; and an outer edge of the second portion is closer to the first flow passage than an outer edge of the first portion, wherein a minimum distance between the outer edge of the second portion and an outer edge of the first flow passage is greater than or equal to 1.5 mm.

15. The electric valve of claim 1, wherein the second portion comprises a bottom wall, the bottom wall comprises a plane segment disposed relatively parallel to an upper surface of the first portion; and in a projection of the valve body to the plane where the first wall is located, a projection length of the plane segment is greater than or equal to one quarter of a projection length of the first portion and is less than the projection length of the first portion.

16. The electric valve of claim 15, wherein the bottom wall further comprises a cambered surface segment, and the cambered surface segment is smoothly transitioned to and connected to the plane segment through a circular arc; and the third wall is smoothly transitioned to and connected to the bottom wall through a circular arc, the second portion further comprises a fourth wall, and the fourth wall is smoothly transitioned to and connected to the bottom wall through a circular arc.

17. The electric valve of claim 16, wherein the first portion and the second portion are an integrated structure; the valve body is connected to the cover body through a first screw, the first portion is formed with a threaded hole, the cover body is formed with a communicating hole, and the first screw is installed in a direction from the cover body to the valve body by passing through the communicating hole and is threadedly connected to the valve body; in a direction perpendicular to an extension direction of the first wall, a height of the first portion is less than a height of the second portion, wherein the height of the first portion is greater than or equal to 6 mm and is less than or equal to 18 mm; and an outer edge of the second portion is closer to the first flow passage than an outer edge of the first portion, wherein a minimum distance between the outer edge of the second portion and an outer edge of the first flow passage is greater than or equal to 1.5 mm.

18. The electric valve of claim 17, wherein the valve body further comprises a second flow passage, the second flow passage is not communicated with the first flow passage, the second flow passage comprises a third open end and a fourth open end, the third open end is communicated with the fourth open end, at least part of the third open end is formed on the first wall, at least part of the fourth open end is formed on the second wall, and a minimum distance between the outer edge of the second portion and an outer edge of the second flow passage is greater than or equal to 1.5 mm; and the valve body further comprises a mounting hole penetrating through the first wall and the second wall, and a minimum distance between the outer edge of the second portion and an outer edge of the mounting hole is greater than or equal to 1.5 mm.

19. The electric valve of claim 18, wherein the valve body further comprises a first mounting portion and a second mounting portion, the first mounting portion has a first cavity, the second mounting portion has a second cavity, the first cavity is able to be communicated with the first flow passage, and the second cavity is communicated with the second flow passage; the electric valve further comprises a sensor, at least part of the sensor is located in the second cavity, the sensor is configured to detect at least one of a pressure or a temperature of a working medium in the second flow passage, and the sensor is fixedly connected to the valve body; the electric valve further comprises a connecting member, the connecting member is electrically conductive and disposed between the sensor and the circuit board, the sensor is electrically connected, signal-connected, or electrically connected and signal-connected to the circuit board through the connecting member, the connecting member comprises a first connecting end and a second connecting end, the first connecting end is fixedly connected to the circuit board, and the second connecting end abuts against the sensor.

20. A thermal management assembly, comprising an electric valve and a heat exchanger, wherein the electric valve is fixedly connected to the heat exchanger, and the electric valve comprises a valve body, a circuit board and a cover body, wherein the cover body is disposed above the valve body, the circuit board is located in an inner cavity formed by the cover body or formed by the cover body and the valve body, and the cover body is fixedly connected to the valve body;

the valve body comprises a first portion and a second portion, the second portion is located below the first portion, the valve body is fixedly connected to the cover body through the first portion, the valve body has a first flow passage, the first flow passage comprises a first open end and a second open end, and the first open end is able to be communicated with the second open end;

the second portion comprises a first wall and a second wall, at least part of the first open end is located on the first wall, and at least part of the second open end is located on the second wall;

the first portion comprises a first side wall and a second side wall, and the first side wall and the second side wall are located on two sides of the valve body, respectively; and the second portion further comprises a third wall, the first side wall and the third wall are located on a same side of the valve body, neither the third wall nor the first side wall has the first open end or neither the third wall nor the first side wall has the second open end, and at least part of the third wall is disposed closer to a reference plane than the first side wall; wherein the reference plane is located between the first side wall and the second side wall and the reference plane is parallel to the first side wall or the second side wall, and the reference plane coincides with a midpoint of a first connecting line; wherein the first connecting line is a connecting line from a midpoint of a projection of the first side wall onto a plane where the first wall is located to a midpoint of a projection of the second side wall onto the plane where the first wall is located.

* * * * *